United States Patent [19]
Norden

[11] 3,908,438
[45] Sept. 30, 1975

[54] LOCK WASHER TAB STRAIGHTENING TOOL

[76] Inventor: Wallace E. Norden, 323 Beverly Ave., Millbrae, Calif. 94030

[22] Filed: Nov. 15, 1974

[21] Appl. No.: 523,960

[52] U.S. Cl.................... 72/458; 29/267; 81/3.46 R; 254/131
[51] Int. Cl.²......................................... B21J 13/08
[58] Field of Search ............ 72/479, 457, 388, 458; 81/3.37, 3.46 R; 29/267; 254/131; 113/1 K

[56] References Cited
UNITED STATES PATENTS

| 427,304 | 5/1890 | Eagan | 29/267 X |
|---|---|---|---|
| 1,211,233 | 1/1917 | Rhonemus | 81/3.46 R |
| 2,162,668 | 6/1939 | Stocker | 254/94 |
| 2,616,317 | 11/1952 | Hakkerup | 72/458 |
| 2,718,375 | 9/1955 | Purdy | 254/131 |
| 2,878,699 | 3/1959 | Stricklett | 72/458 |
| 3,164,893 | 1/1965 | Ashworth | 254/131 X |

*Primary Examiner*—C. W. Lanham
*Assistant Examiner*—Victor A. DiPalma
*Attorney, Agent, or Firm*—Julian Caplan

[57] ABSTRACT

Tool to bend or straighten lock washer tabs in confined space. Specifically, the tool is used to bend outward the lock washer tabs which hold the propellor assembly on the end of the motor shaft of an outboard or inboard motor. Such an assembly includes a tube for underwater exhaust surrounding the nut and washer which interferes with lateral approach to the tabs. The tool comprises a handle having a tapered distal point which fits into the central countersink on the end of the shaft. A hook-shaped member is pivoted to the handle adjacent its end. In use, with the point in the countersink, the handle is tilted until the hook fits under the bent tab; the handle is pivoted to a position along the shaft axis, thereby bending the tab. To reverse the bending operation, the handle provides a convenient bending tool.

3 Claims, 3 Drawing Figures

LOCK WASHER TAB STRAIGHTENING TOOL

This invention relates to a new and improved lock washer tab straightening tool. The invention has particular application as a tool used in removing the lock nut, lock washer and nut from the shaft of the Mercury outboard or inboard engine propellor shaft. The shaft is threaded and receives a nut formed with a plurality of peripheral alternating lugs and depressions. Between the nut and the lock nut, which is also threaded on the shaft, is a lock washer formed of a bendable material and having a plurality of radially extending tabs. Immediately prior to completion of the assembly, one or more of the tabs of the lock washer are bent inwardly between the lugs of the nut into the depressions. When it is necessary to remove the nut, the tabs of the lock washer must first be bent to radial position. Such operation is difficult because the nut, washer and lock nut assembly is surrounded by a tube for underwater exhaust which is an extension of the propellor, and the space between the lock washer and the tube is such that insertion of a tool to bend the lugs is difficult. The present invention, therefore, has for its principal object the provision of a tool which will fit into the annular space between the lock washer and the tube and conveniently straighten the tab.

Advantages of the invention are its inexpensive and simple construction and the conveniences with which it can be used.

Another advantage of the invention is the fact that the tool may be used to bend the tabs downward as well as to straighten the same.

Other objects of the present invention will become apparent upon reading the following specification and referring to the accompanying drawings in which similar characters of references represent corresponding parts in each of the several views.

Figure 1:
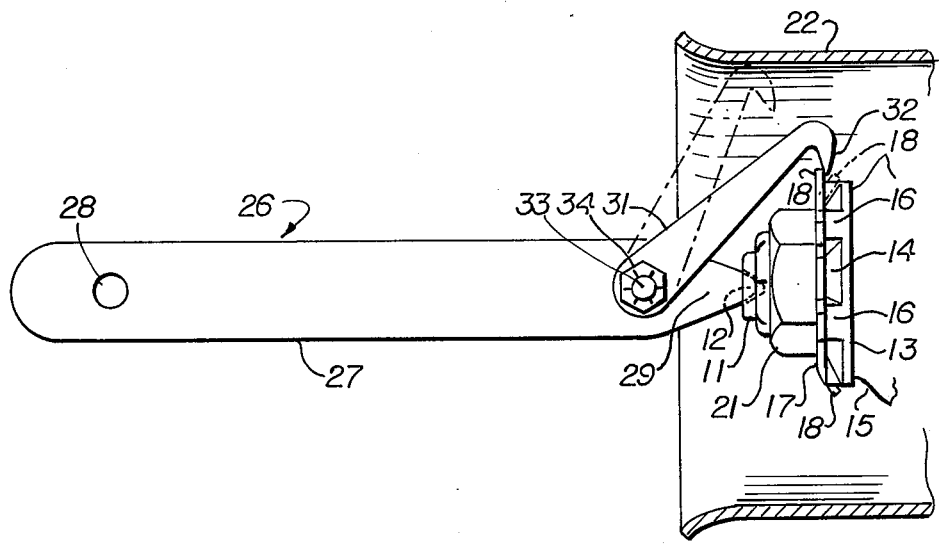
FIG. 1 is a vertical, sectional view through the tube showing the tool at the completion of the straightening operation and showing the hook-like member in dot-and-dash line position preliminary to use.

Shown in FIG. 1 FIG. 1 is a portion of the tail of a Mercury outboard engine. The end of shaft 11 is illustrated, it being understood that said shaft is externally threaded. A driven member 15 having a shoulder is attached to shaft 11. The outer end of shaft 11 is formed with the conventional conical centering depression 12 customarily formed at the commencement of machine operations on a shaft. To hold member 15 on shaft 11 there is provided a spacer or washer 13 splined to rotate with shaft 11. In the Mercury engine, spacer 13 is castellated in that there are arcuately spaced apart lugs 16 with depressions 14 there-between. Outside spacer 13 is a lock washer 17 having radially extending bendable tabs 18. Outermost on shaft 11 is a nut 21. When the parts are assembled as shown in FIG. 1, some (preferably three of the six) tabs 18 are bent downwardly into the depressions 14 between the lugs 16. When thus bent, the spacer 13, lock washer 17 and nut 21 are fixed in place. Surrounding the assembly is a flared underwater exhaust tube 22 which also is part of the propeller (not shown). The annular space between the washer 13 and the tube 22 is not sufficient for a lateral approach to the bending of the tabs 18. The tool 26 of the present invention is used for such purpose.

Figure 3:
FIG. 3 is a fragmentary view of a modification.

Tool 26 has a handle 27 formed with a hole 28 at its proximal end for convenient storage of the tool between uses. The distal end of handle 27 is formed with a tapered point 29 shaped to fit within the depression 12. Member 31 is pivoted to handle 27 by means of a pivot screw 33 and held in place by nut 34. By tightening nut 34, the effort required to pivot member 31 is adjusted. Alternatively, a shouldered rivet 36 may be used in place of screw 33. (FIG. 3) The outer end of member 31 is formed with a hook 32.

Figure 2:
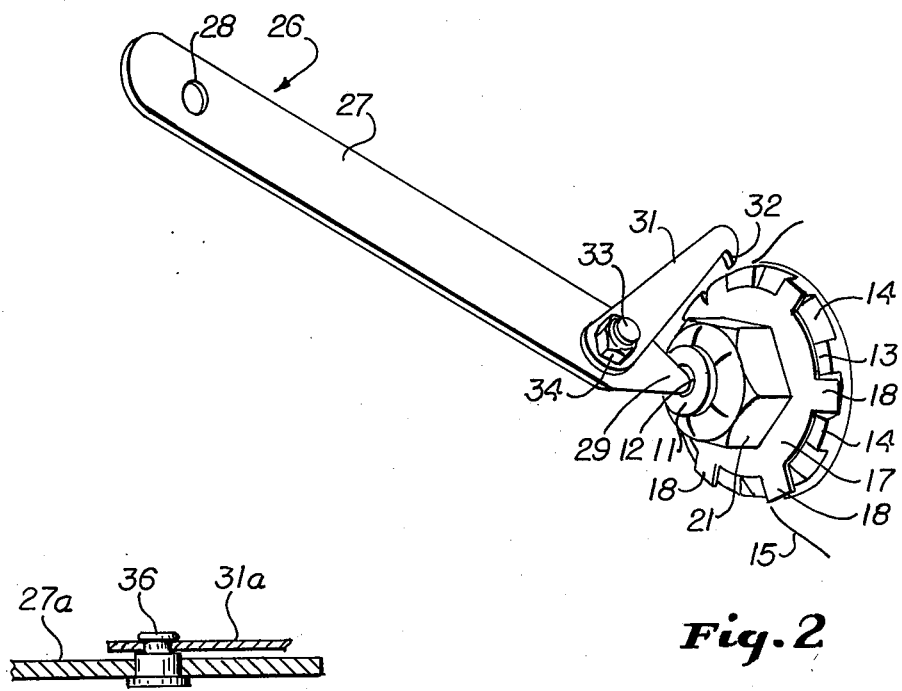
FIG. 2 is a perspective view of a portion of the assembly of FIG. 1 showing the tool at the commencement of the unbending operation.

In the use of the device, initially the point 29 is inserted in the depression 12 and the handle 27 is tilted at an angle, as best shown in FIG. 2. Hook 32 is inserted under one of the bent tabs 18. Thereupon, the handle 27 is pivoted to a position approximately axial of shaft 11 as is best shown in FIG. 1. This bends the tab 14 at the top of the shaft of FIG. 1 from its dotted line position to solid line, radially-extending position out of depression 12. When all of the downward bent tabs 18 are straightened, the nut 21, lock washer 17 and spacer 13 may be easily removed. When the parts are replaced, the end of handle 27 may be used to force the tabs 18 to bent position.

What is claimed is:

1. A tool for the purpose of straightening a lock washer tab bent into the inter-lug depression between adjacent lugs of a castellated splined spacer and wherein there is a tube surrounding the lock washer with insufficient annular space between said tube and said washer for lateral approach to said tab and wherein said washer and spacer are installed on the threaded end of a shaft having a conical centering depression at its outer end, said tool comprising a handle having a tapered distal end shaped to fit into said centering depression, a hook member formed with a hook at its outer end and an aperture near its inner end, and means adjacent said distal end for pivotally attaching the inner end of said member to said handle, the length of said member being such that, when said handle is tilted relative to the axis of said shaft with said distal end in said depression, said hook fits under said bent tab and when said handle is pivoted to axial position said tab is straightened to approximately radial position out of said inter-lug depression, permitting removal of said lock washer and said spacer.

2. A tool according to claim 1 in which said means is a bolt and nut, said bolt passing through an aperture in said handle spaced proximally of said distal end.

3. A tool according to claim 1 in which said means is a shouldered rivet passing through an aperture in said handle spaced proximally of said distal end.

* * * * *